Sept. 5, 1967  P. McDONALD  3,339,666
PULSED HIGH FREQUENCY ACOUSTIC LOGGING
Filed Oct. 27, 1964  3 Sheets-Sheet 1
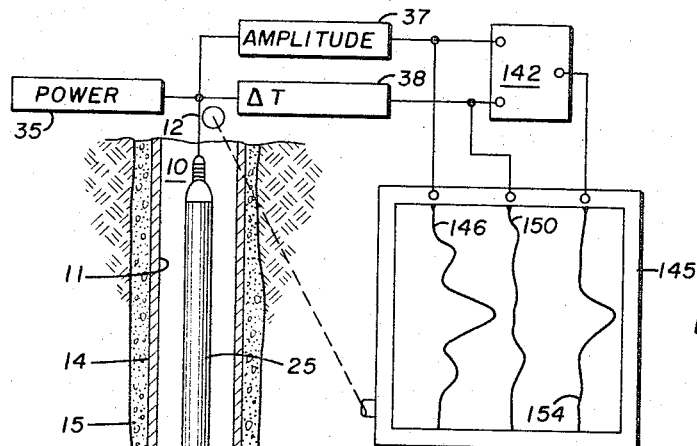
FIG. 1
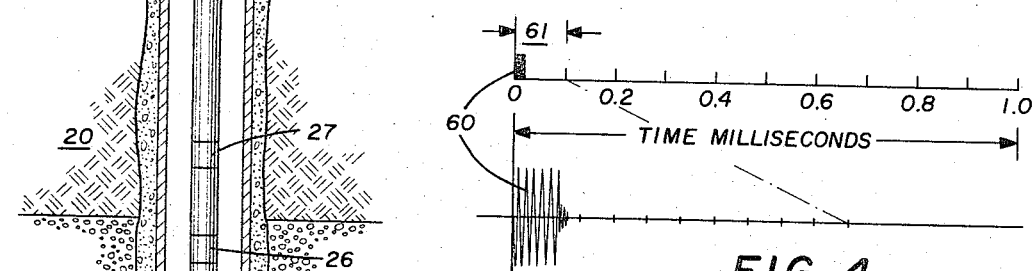
FIG. 4
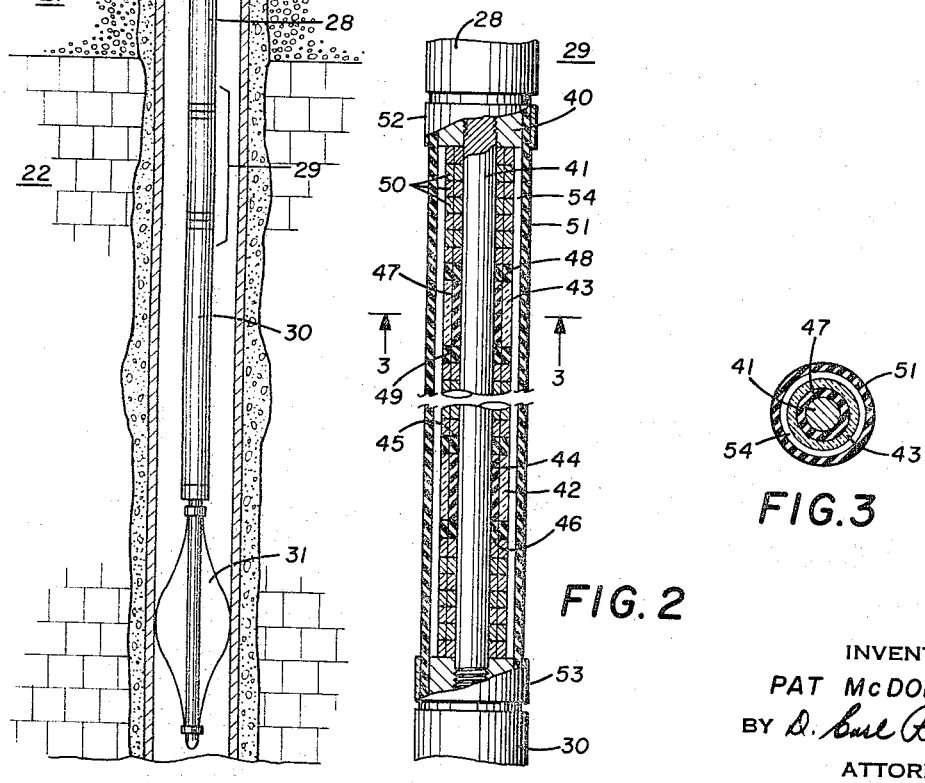
FIG. 2
FIG. 3
INVENTOR
PAT McDONALD
BY D. Carl Richards
ATTORNEY INVENTOR
PAT McDONALD
BY [signature]
ATTORNEY Sept. 5, 1967 P. McDONALD 3,339,666
PULSED HIGH FREQUENCY ACOUSTIC LOGGING
Filed Oct. 27, 1964 3 Sheets-Sheet 3

INVENTOR
PAT McDONALD
BY
ATTORNEY

United States Patent Office 3,339,666
Patented Sept. 5, 1967

3,339,666
PULSED HIGH FREQUENCY ACOUSTIC
LOGGING
Pat McDonald, 319 Leonhardt Bldg.,
Oklahoma City, Okla. 73102
Filed Oct. 27, 1964, Ser. No. 406,777
9 Claims. (Cl. 181—.5)

This invention relates to acoustic logging of boreholes and more particularly to a pulsed reflection system operative in the ultrasonic range wherein a function representing energy from substantially the entire received signed is recorded as a function of borehole depth.

In acoustic well logging of the type generically disclosed in U.S. Patent 2,704,364, acoustic pulses are transmitted from within the borehole and are detected for the determination of the velocity of the formations, the constituents therein, or the characteristics of the borehole. In applicant's prior Patent 2,813,590, a method of logging a borehole is described in which pulses are transmitted to and reflected from interfaces formed between natural formation fluids and invading fluids. The present invention involves methods which result in substantially improved definition of the formation characteristics.

The present invention relates to the use of ultrasonic frequency in the hundreds of kilocycles range and more particularly to the measurement of the amplitude of high frequency acoustic energy reflected from borehole walls or transmitted along borehole walls as a tube wave. In a specific aspect, the invention relates to the investigation of earth formations penetrated by a borehole by transmitting from a first position a pulsed beam of ultrasonic radiation through the borehole at a path which is substantially perpendicular to the adjoining formations exposed at the wall of the borehole. At a second position, ultrasonic radiation reflected from the formations is detected. A signal is generated from the detected energy representative of the amplitude of the detected energy. The latter signal is then recorded as a function of borehole depth and is representative of acoustic impedance or the product of density and acoustic velocity of the earth formations. A velocity function for the same formations is then employed to produce a ratio signal which represents the formation density.

In a further aspect, a tube wave at ultrasonic frequencies above about 100 kilocycles is transmitted along the borehole. The tube wave is detected and a signal is generated representative of the amplitude of the detected wave. The latter signal, representative of a tube wave controlled primarily by formation density is then recorded as a function of borehole depth. In still a further aspect, a directional beam is transmitted perpendicularly to the borehole walls and the transit time of the reflected energy is recorded as a function of depth to provide a measure of variations in borehole diameter.

In a further aspect, the invention relates to new transmitting and receiving structures operable in well logging environments at frequencies of the order of 200 to 400 kilocycles. A highly directional transmit-receive unit with dispersive-absorptive means provides for measurement of primary reflections as velocity or amplitude functions of borehole and formation characteristics.

For a more complete understanding of the present invention and for further objects and advantages thereof, reference may now be had to the following description taken in conjunction with the accompanying drawings in which:

FIGURE 1 illustrates a well logging tool embodying the present invention;

FIGURE 2 is a vertical sectional view of a portion of the system of FIGURE 1;

FIGURE 3 is a sectional view taken along line 3—3 of FIGURE 2;

FIGURE 4 is a time plot of the signals involved in operation of the system of FIGURES 1–3;

Figure 5:
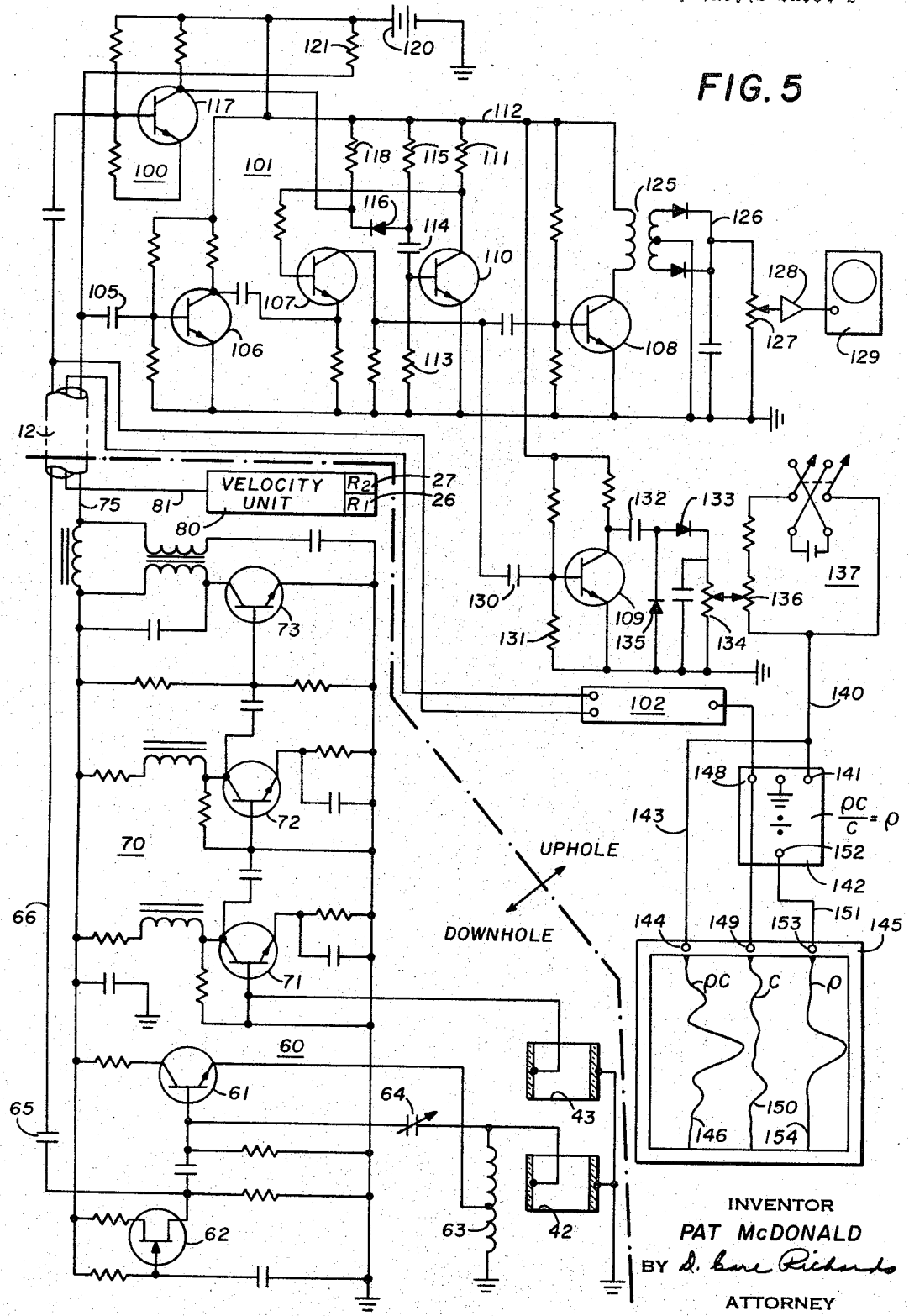
FIGURE 5 illustrates the driving and sensing system for the unit of FIGURES 1–3.

Referring now to FIGURE 1, a well logging tool 10 is supported in a borehole 11 by a cable 12. The borehole tool is shown in a section of the borehole 11 in which a casing 14 is secured in place by cement 15. The borehole extends through a consolidated formation 20, a porous or sandy formation 21, and a shale section 22.

In one form, the borehole tool 10 includes an upper instrument section 25, a pair of receivers 26 and 27, a spacer 28, a transmit-receive section 29, a weight 30 and a centralizer 31. A power supply unit 35 is connected to the cable 12 for supplying power to the transmit-receive unit 29 and to the instruments in section 25. A first measuring unit 27 is responsive to signals received in the transmit-receive unit 29 and is a velocity and density dependent amplitude function. The acoustic pulse produced in the unit 29 travels upward through the earth formations and energizes the receivers 26 and 27 successively, so that a function is produced at the output of a velocity unit 38 which is proportional to the time interval required for the pulse to travel over the formations between the receivers 26 and 27.

The velocity portion of the system will not be described in detail since such systems are well known. Patents 2,704,364; 2,938,592; 2,708,485; and 2,931,455 are representative of systems for producing ΔT or velocity function as produced at the output of unit 38.

The present invention involves the use of a new transmit-receive system or unit 29. Also involved is a correlation of the data produced by such transmit-receive system with data from the velocity measuring portions of the system of FIGURE 1.

FIGURE 2 illustrates one form of the transmit-receive unit 29 in detail. The spacer unit 28 has an extension 40 into which a support rod 41 is threaded. The rod 41 serves as a mandrel for the mounting of a piezoelectric transmitting cylinder 42 and a companion receiving cylinder 43. Cylinder 42 is mounted on mandrel 41 by a rubber sleeve 44. Rubber washers 45 and 46 are mounted above and below the tube 44 and the transmitter 42. Similarly, a rubber sleeve 47 provides a resilient mounting for the receiver 43. Rubber washers 48 and 49 are mounted on the mandrel 41 above and below the sleeve 47 and the receiver 43.

The lower end of the rod 41 is threaded into the upper end of the weight 30. Lead washers 50 encircle the rod 41 and occupy the space between the extension 40 and washer 48 as well as the space between washers 49 and 45 and between washers 46 and the end of the unit 30. The lead washers serve to filter or attenuate acoustic energy which tends to travel directly along the rod 41. A rubber tube 51 is stretched over the assembly and is clamped onto the extension 40 by a band 52. Similarly, a band 53 clamps the lower end of the tube 51 onto the top of the weight 30. The zone 54 between the elements mounted on rod 41 and the inner wall of the rubber cylinder 51 is then filled with a suitable acoustic transmitting liquid such as castor oil or a silicone. While the tube 51 is shown spaced from the elements mounted on mandrel 41, the tube 51 normally would be in contact with the elements, with the inner surface oil wet for acoustic coupling purposes.

The sectional view of FIGURE 3 shows a receiver 43, the rubber cylinder or sleeve 51, the silicone in zone 54, the receiver cylinder 43, the tube 47 and the rod 41 occupying zones of successively smaller diameter. Thus, the unit is symmetrical about the axis of the rod 41.

In practice, the transmitter 42 is energized with repeated time-spaced pulses of ultra-high frequency energy. Pulses 60, shown in FIGURE 4, are applied to the transmitter 42 at 2 millisecond intervals. The excitation pulse 60 is of a duration of about 15 microseconds. The frequency preferably is in the frequency range such that the acoustic waves traveling outwardly therefrom will have a half wavelength in steel which is equal to the thickness of the casing 14. By this means, transmission through the casing will be optimum. Thus, the signal passing outwardly will be reflected by the discontinuity between the outer wall of the casing and the inner face of the cement body 15. Further, energy will be reflected from the interface between the cement body 15 and the formations through which the borehole extends. Energy reflected from such interfaces, and any reflectors beyond the borehole wall, will be sensed by the receiver 43. As indicated in FIGURE 4, the receiving channel may be gated out or blanked out for a time gate of 100 microseconds following the onset of each excitation pulse. However, all of the reflected energy received after the gate 61, and prior to the onset of the next succeeding excitation pulse, is integrated or summed in the unit 37 for the production of an output signal which is indicative of the character of the formation. Energy reflected from the inside of the casing will be constant and will serve to bias the received signal level. Energy reflected from the outer wall of the casing and from the interface between the cement and the formation will give character to the log, depending upon the properties of the materials involved.

Operation of the system involves the use of high frequency acoustic pulses of the order of 400 kilocycles per second. It has been found that when signals employed are below 150 kilocycles per second, erratic and undependable results are obtained. In some uses, it will be desired that transmission through the casing which lines the borehole be maximized. The frequency, in such cases, should be such that the wavelength in steel of the acoustic energy is equal to twice the casing wall thickness. For seven-inch casing having a weight of 23 pounds per foot, a calculated value for the desired operating frequency is 330 kilocycles per second. Actual measured values from maximum transmission through such casing have been found to be about 380 kilocycles per second.

FIGURE 5 illustrates the circuitry associated with the unit 29 and the receivers 26 and 27. Referring to FIGURE 5, the transmitter 42 of FIGURE 2 is excited by repeated pulses of high frequency energy generated by a relaxation of oscillator 60 which includes transistor 61 and a unijunction transistor 62. The oscillator coil 63 is connected at one extremity to ground and at the other extremity to the electrical terminal on the inner wall on the cylinder 42. The outer terminal of the cylinder 42 is connected to ground. The mid-tap on the coil 63 is connected to the emitter of transistor 61. The upper terminal of the coil 63 is connected by way of variable condenser 64 to the base of the transistor 61. The oscillator circuit 60, including the transistor 61 and the unijunction transistor 62, is of the type generally well known in the art. In the present case, it is tuned to a frequency in the range of about 400 kilocycles and has a time constant such that it will produce output pulses of about 10 microseconds duration at about 2 millisecond intervals. A synchronizing pulse is applied by way of capacitor 65 to a conductor 66 which leads to the earth's surface in the cable 12.

The receiver crystal 43 is connected to the input of a three-stage amplifier 70 which includes transistors 71, 72 and 73. By this means, there is produced on the conductor 75, a signal representative of energy in the signals detected by the receiver 43 in the interval between pulses produced by the transmitter 42.

The two receivers 26 and 27 are coupled to a velocity unit 80 which applies output signals on conductor 81 representative of the difference in time required for each pulse produced by the transmitter 42 to travel from receiver 26 to receiver 27.

At the earth's surface, the three conductors 66, 75 and 81 lead to the inputs to trigger amplifier 100, an amplifier 101, and a velocity unit 102. More particularly, the output signal channel 75 is applied by way of condenser 105 to the input of an input amplifier stage having transistor 106 therein. The second stage of the amplifier, including transistor 107, supplies output signals to an oscilloscope amplifier 108 and to a recording amplifier including transistor 109. A gating unit including transistor 110 is controlled by the amplifier 100, so that the transistor 107 may be gated off for about 100 microseconds after the appearance of each synchronizing pulse on channel 66. The gating transistor 110 has its emitter connected to ground; its collector is connected by way of the resistor 111 to the B+ bus 112. The base of transistor 110 is connected by way of resistor 113 to ground and by way of condenser 114 and resistor 115 to the B+ bus 112. The juncture between condenser 114 and resistor 115 is connected by way of the diode 116 to the collector of the transistor 117 in the amplifier 100. The diode 116 is connected by way of resistor 118 to the B+ bus. The surface circuits are supplied with power from a battery 120 which supplies the amplifier 100 and the gated amplifier 101, as well as the output amplifier 109.

A load resistor 121 is connected to the conductor 66 across which a pulse voltage is developed for application to the amplifier 100. The transistor 108 has an output which is applied by way of transformer 125 to a full wave rectifier 126, the output of which is then applied by way of potentiometer 127 and amplifier 128 to a display unit such as an oscilloscope 129.

The signal at the output of the transistor 107 is applied by way of condenser 130 to a base of transistor 109. The emitter of transistor 109 is connected to ground, as is the base thereof, by way of resistance 131. The collector of transistor 109 is connected by way of condenser 132 and diode 133 to an output potentiometer 134. The juncture between condenser 132 and diode 133 is connected to ground by way of a diode 135. The variable tap of potentiometer 134 is connected to a similar tap on a potentiometer 136 in a balancing circuit 137. The voltage across the potentiometer 136 is applied by way of conductor 140 to the input terminal 141 of a processing unit 142. Conductor 143 also applies the output from the balancing circuit 137 to an input terminal 144 on a multitrace recorder 145.

Thus, the amplitude-dependent signal received by the receiver 43 is integrated at the output of the transistor 109 and is applied to the process unit 142 and also to the recorder 145 where the amplitude data is recorded as a trace 146. Velocity data from unit 102 is applied to the second terminal 148 of the unit 142 as well as to the terminal 149 of the recorder 145. By this means, the trace 150 is a velocity signal.

The output of the unit 142 is representative of density of the earth formations. The line 151 connects the output terminal 152 of the processor 142 to a third input terminal 153 of the recorder 145. It is by this means that the trace 154 represents primarily a density function.

Figure 6:
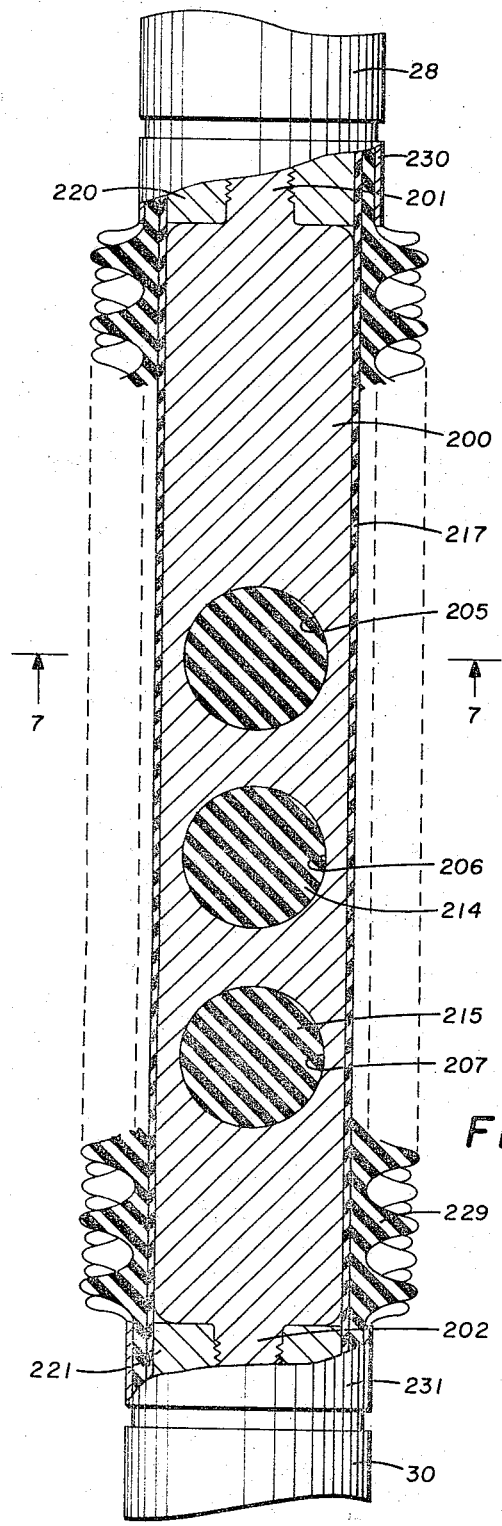
FIGURE 6 is a directional form of the sensing unit.

FIGURE 6 illustrates a directional embodiment of the present invention. A mandrel 200 is coupled at the upper end to the housing 28 and at the lower end to the weight 30. The threaded extremities 201 and 202 are provided for this purpose and are received by extensions 220 and 221, respectively. Mandrel 200 has three parallel cylindrical apertures 205, 206, and 207 extending therethrough.

Figure 7:
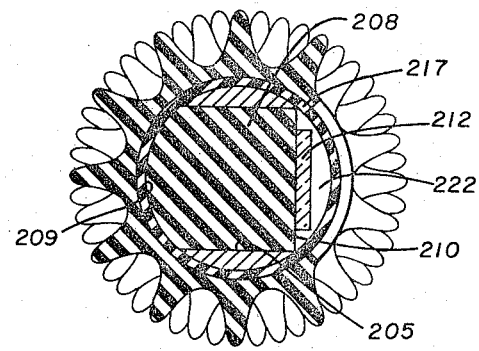
FIGURE 7 is a sectional view taken along line 7—7 of FIGURE 6.

As best shown in the sectional view of FIGURE 7, the aperture 205 is filled with a rubber plug 208. The plug 208 has a curved rear face 209 conforming with the surface of mandrel 200 and a planar front face 210. A piezoelectric disk crystal 212 is mounted on the planar face of the plug 208. In a similar manner, apertures 206 and 207 are filled with plugs 214 and 215. While not shown, a crystal, like crystal 212, is provided on the face of each of plugs 214 and 215 and faces the same direction as the crystal 212. A rubber tube 217 extends over the surface of the cylinder 200 and onto the extensions 220 and 221 at opposite ends thereof. The zone 222 (FIGURE 7) between the face of the crystals 212 and the inner wall of the tube 217 is filled with a suitable acoustic transmission liquid such as castor oil or a silicone.

An acoustic absorbent layer 229 encases the tube 217. The layer 229 preferably is of a neoprene rubber, having an ordered pattern of surface projections or cones extending therefrom. The layer 229 and the cylinder 217 are clamped onto the extensions 220 and 221 by bands 230 and 231, respectively.

As best shown in FIGURE 7, a circular window is formed in the layer 229 at the axis of the crystal 212. Similar windows are formed in the layer 229 at the axis of the apertures 206 and 207, respectively. With this system, the crystal in aperture 206 serves as a transmitter. The crystal 212 and the companion crystal in aperture 207, connected in parallel, may serve as receiving crystals. The transmitter and receivers may be substituted directly in the circuit of FIGURE 5 for the transmitter and receiver cylinders 42 and 43.

The system of FIGURES 6 and 7 is highly directional in character. The layer 229 serves to reduce reverberation by absorbing reflected energy except that which impinges the crystals. Thus, the system of FIGURES 6 and 7 has far higher resolution than the system of FIGURES 1–5.

In operation, the particular transducer configurations, in combination with selected portions of the frequency spectrum, permit certain physical parameters of the rock formation to be measured. Heretofore, these parameters could not be separably measured.

For example, a log, primarily controlled by the specific acoustic impedance of the rock surrounding the borehole, is obtained in the following manner. The transducer illustrated in FIGURE 6 projects a highly directive pulse from the borehole instrument out to the rock surrounding the borehole. Only energy that is reflected essentially normal to the wall will be detected. This is accomplished by using the element in aperture 206 as a projector or transmitter and elements in apertures 205 and 207 as receivers. Each of these elements are similar and are shown in detail in FIGURE 7. The acoustic generator is a crystal, illustrated as disk 212, cemented to a rubber material 208. This provides for high decoupling of the crystal support. Surrounding the assembly is an acoustic dispersion shield 229 in the form of multicones of rubber to give a high absorption of any reverberation energy. An acoustic window in shield 229, shown in FIGURE 7, permits radiated energy to escape from the tool as well as reflected energy to be received by elements in apertures 205 and 207. By this means, only a sharp beam of acoustic energy is released and the receiver elements only see energy that is reflected perpendicularly from the rock surface. Energy trapped by reflections in the borehole is quickly absorbed by the dispersion shield so that no back reflections or multiples (reverberations) from borehole reflections are possible. Thus, only one arrival is detected, which is the primary reflection normal to the rock. The amount of energy reflected from the rock surrounding the borehole is given by the familiar equation:

$$k = \frac{\rho_1 c_1 - \rho_2 c_2}{\rho_1 c_1 + \rho_2 c_2}$$

Thus, the acoustic impedance ratio $\rho_1 c_1 / \rho_2 c_2$ is a measure of the reflection factor. In the borehole case, the fluid in the borehole $\rho_1 c_1$ is continuous and therefore the main variable is $\rho_2 c_2$, which is the impedance of the rock. The reflected energy detected by elements in apertures 205 and 207 from a signal projected from transmitter 206 is therefore proportional to the acoustic impedance $\rho_2 c_2$ of the rock. Such a recording is illustrated in FIGURE 5 as trace 146, obtained by rectifying and integrating the output signal from transistor 109.

Concurrent with the measurement of acoustic impedance, the compressional velocity is measured as previously described in FIGURE 1.

The section, shown in FIGURES 6 and 7, is interchangeable with element 29 of FIGURE 1, and is the preferred element for obtaining a measurement of acoustic impedance. The same transmitted pulse used for acoustic impedance can be used for velocity measurements as detected by 26 and 27. The transit time between signals detected by receivers 26 and 27 is a measure of formation velocity and is converted in unit 38 to an analog voltage for recording as trace 150. This same voltage is applied to unit 142 in conjunction with the acoustic impedance signal. Since the acoustic impedance is equal to $\rho c$ in the velocity as measured, the formation density is then derived by dividing the $\rho c$ signal at terminal 141 by the $c$ signal 148 in divider 142 to give an output on line 151 equivalent to formation density. Thus, three separate physical parameters of the rock are recorded.

It has been found that timing circuitry the same as used in the velocity measuring channel can also be used to measure the time for the pulse from transducer 206 to travel to the rock and back to elements in apertures 205 or 206. This path is always in the borehole fluid and is of constant velocity. Therefore, this time is a measure of the distance traveled by the pulse and is the borehole size. It can be recorded in place of the signals from elements 26 and 27 and recorded similarly as trace 150 to give borehole size. In this mode of operation, the trace 154 is not recorded since signal 148 is not the rock velocity.

Another mode of operation involves the use of section 29 of FIGURE 2 in place of the section of FIGURE 6. In this mode, the separation of receiver element 43 from transmitter element 42 is of the order of from 2 to 3 feet. Again, the pulse frequency is of the order of several hundred kilocycles. It has been found that the frequency of 400 kilocycles works well. At such frequencies and with such spacings, the main component of energy is found to be the tube wave. This has been verified by its time of arrival, i.e. at a velocity lower than a free water pulse. Thus, a wave is detected that has been propagated in a tube wave mode and is dependent on the characteristics of the borehole wall or the rock.

It is well known that the losses in transmission of an acoustic signal are the result of four prime factors, i.e. (1) heat conduction, (2) viscous friction, (3) elastic hysteresis, and (4) scattering. It is also recognized that the first two items generally are the primary controlling factors in fluid-rock systems of the borehole type. The exception is found where the borehole drilling fluid is a suspension of colloids or drilling additives, in which case scattering plays an important part as a constant in the attenuation factor. Below the relaxation frequency (frequency where the real and imaginary terms are equal), losses from friction are pure viscous losses and are proportional to $(2\pi f)^2$. In the relaxation frequency band, the losses are proportional to $2\pi f$. Above this band they exhibit the effect of pure stiffness with losses proportional to $(2\pi f)^{1/2}$. Typically, a relaxation frequency of 100 kilocycles is found in borehole fluids. Thus, by using a 400 kilocycles signal, operations are in the range in which pure shear stiffness ($R_m = \rho c_s$) controls, where $R_m$=acoustic impedance; $\rho$=density; and $c_s$=shear velocity. At such frequencies, heat conduction losses are low because of thermal lag. A plot of a tube wave signal then reflects the acoustic impedance, $R_m$. Logs taken with such a system in an open hole are very similar in character to a gamma neutron log and thus verify that the signal being received is controlled by formation density. By this means, a density equivalent log is plotted as trace 146 without the need for a velocity log, since the velocity log gives compressional velocity $c_c$, not shear velocity $c_s$. To correct the log properly would require measurement of $c_s$. However, since $c_s$ is less than ½ $c_c$, the acoustic impedance is approximately equal to density, or, expressed mathematically, $R_m \approx \rho$.

Thus, a logging system capable of producing a variety of curves is disclosed. The curves reflect acoustic impedance and density with and without the use of an accessory velocity trace.

In one aspect, the invention includes transmitting pulsed beams of ultrasonic radiation from a first position in a borehole and over a limited azimuth angle to impinge the walls of the borehole perpendicular thereto. At a second position immediately adjacent the first position, ultrasonic radiation reflected from adjacent formations is detected. Multiple reflections of the transmitted energy are scattered and absorbed. The logging tool is moved along the length of the borehole so that the locations in the borehole of the transmitting and receiving positions are varied. As indicated in FIGURE 1, the recording chart is driven in proportion to depth. A signal is generated and registered as a function of depth which is representative of the travel time of the primary reflection of the radiation. In accordance with a further aspect, amplitude of the received signal is recorded as a function of depth, and represents, in one case, the tube wave and in another case, it represents the amplitude of direct reflection energy.

Having described the invention in connection with certain specific embodiments thereof, it is to be understood that further modifications may now suggest themselves to those skilled in the art and it is intended to cover such modifications as fall within the scope of the appended claims.

What is claimed is:

1. An acoustic system for logging a cased borehole which comprises:
    (a) a transmitter and receiver mounted adjacent one another,
    (b) means for exciting said transmitter with time-spaced pulses of ultrasonic frequencies whose wavelength in steel is twice the thickness of the borehole casing, and
    (c) a detecting system connected to said receiver for generating an output signal representative of the integral of all energy received following a predetermined time gate after each transmitted pulse.

2. An acoustic well logging system which comprises:
    (a) a cylindrical support,
    (b) a pair of parallel apertures extending transversely into said support,
    (c) a resilient plug in each of said apertures,
    (d) a piezoelectric disk mounted on one face of each of said plugs,
    (e) a sleeve encompassing said support and filled with an acoustic transmitting liquid,
    (f) a sound absorbent member encompassing said sleeve with windows therein at the locations of said disks,
    (g) means for exciting one of said disks at ultrasonic frequencies, and
    (h) a receiving circuit connected to the other of said disks including means for generating an output signal representative of the total energy received following a selected time gate after excitation of said one of said disks.

3. An acoustic logging system for logging a well bore having casing set therein which comprises:
    (a) a cylindrical support,
    (b) a pair of parallel apertures extending transversely into said support,
    (c) a resilient plug in each of said apertures,
    (d) a piezoelectric disk mounted on one face of each of said plugs,
    (e) a sleeve encompassing said support and filled with an acoustic transmitting liquid,
    (f) a sound absorbent member encompassing said sleeve with windows therein at the locations of said disks for transmission of acoustic energy to and from said disks,
    (g) means for exciting one of said disks at frequencies at which the resultant acoustic energy has a half wavelength in steel equal to the thickness of said casing, and
    (h) a receiving circuit connected to the other of said disks including means for generating an output signal representative of the total energy received following a selected time gate after excitation of said one of said disks.

4. In an acoustic logging system the combination which comprises:
    (a) a cylindrical support,
    (b) a pair of piezoelectric cylinders mounted at spaced points along said support on resilient sound absorbent end members flanking both said cylinders,
    (c) a sleeve encompassing said support and said cylinders and filled with an acoustic transmission fluid,
    (d) means for exciting a first of said cylinders at ultrasonic frequencies,
    (e) means connected to the second of said cylinders for generating a signal representative of reflected acoustic energy resulting from excitation of said first of said cylinders, and
    (f) means for integrating said signal to produce an output function proportional to the integral of all energy received after a predetermined time gate following each excitation of said first of said cylinders.

5. An acoustic logging tool which comprises:
    (a) a rigid mandrel having at least a pair of parallel transversely directed apertures therein,
    (b) a body of resilient material in each of said apertures each having a planar face located within said mandrel with the faces similarly directed,
    (c) a piezoelectric crystal mounted on each of said faces,
    (d) a resilient cylinder encompassing said mandrel with an acoustic transmission liquid filling all voids inside said cylinder not occupied by said mandrel,
    (e) an acoustic absorbent sleeve encompassing said cylinder and having windows therein in registration with the locations of said crystals, and
    (f) means for supporting said mandrel for movement along the length of a borehole.

6. The combination set forth in claim 5 in which said mandrel has three apertures therein, each of which includes resilient cylinders and crystals.

7. The method of investigating subterranean formations adjoining a borehole which comprises:
    (a) transmitting a pulsed beam of ultrasonic radiation from a first position through said borehole along a path substantially normal to the adjoining formations,
    (b) detecting at a second position adjacent to said first position ultrasonic radiation reflected from said adjoining formations,
    (c) generating a signal representative of the integrated magnitude of the ultrasonic radiation received following a predetermined time gate after each transmitted pulse, and
    (d) recording said detected radiation as a function of borehole depth.

8. The method set forth in claim 7 in which reverberation energy is damped and only primary reflection energy is detected.

9. The method set forth in claim 7 in which said second position is spaced a distance equal to a plurality of borehole diameters from said first position so that said detected signal represents a tube wave substantially controlled by the variations in density of said adjacent formations.

References Cited

UNITED STATES PATENTS

| | | | |
|---|---|---|---|
| 2,631,270 | 3/1953 | Goble | 181—.5 |
| 2,813,590 | 11/1957 | McDonald | 181—.5 |
| 2,825,044 | 2/1958 | Peterson | 181—.5 |
| 2,913,602 | 11/1959 | Joy | 340—8 |
| 2,994,398 | 8/1961 | Engle et al. | 181—.5 |
| 3,009,131 | 11/1961 | Woodworth | 181—.5 |
| 3,175,638 | 3/1965 | Hubbard et al. | 181—.5 |
| 3,182,285 | 5/1965 | Vogel | 181—.5 |
| 3,252,131 | 5/1966 | Vogel | 181—.5 |

BENJAMIN A. BORCHELT, *Primary Examiner.*

W. KUJAWA, *Assistant Examiner.*